(12) United States Patent
Huang et al.

(10) Patent No.: US 12,451,784 B2
(45) Date of Patent: Oct. 21, 2025

(54) LINEAR VIBRATION MOTOR HAVING NON-CONTACT VIBRATION DAMPING, AND IMPLEMENTATION METHOD THEREFOR

(71) Applicant: ZHEJIANG DONGYANG DONGCI CHENGJI ELECTRONICS CO., LTD., Zhejiang (CN)

(72) Inventors: Haojing Huang, Dongyang (CN); Xinxin Wang, Dongyang (CN)

(73) Assignee: ZHEJIANG DONGYANG DONGCI CHENGJI ELECTRONICS CO., LTD., Dongyang (CN)

( * ) Notice: Subject to any disclaimer, the term of this patent is extended or adjusted under 35 U.S.C. 154(b) by 215 days.

(21) Appl. No.: 18/003,324

(22) PCT Filed: Jun. 14, 2021

(86) PCT No.: PCT/CN2021/099922
§ 371 (c)(1),
(2) Date: Dec. 26, 2022

(87) PCT Pub. No.: WO2022/001644
PCT Pub. Date: Jan. 6, 2022

(65) Prior Publication Data
US 2023/0253865 A1    Aug. 10, 2023

(30) Foreign Application Priority Data
Jul. 1, 2020 (CN) .......................... 202010619035.9

(51) Int. Cl.
*H02K 33/02* (2006.01)
*H02K 5/24* (2006.01)
*H02K 41/02* (2006.01)

(52) U.S. Cl.
CPC ............. *H02K 33/02* (2013.01); *H02K 5/24* (2013.01); *H02K 41/02* (2013.01); *H02K 2203/03* (2013.01)

(58) Field of Classification Search
CPC ............................. H02K 33/02; H02K 41/02
(Continued)

(56) References Cited

U.S. PATENT DOCUMENTS

| 2011/0203061 | A1* | 8/2011 | Takahashi | H02K 33/18 |
| | | | | 310/38 |
| 2012/0313459 | A1* | 12/2012 | Zhang | H02K 33/18 |
| | | | | 310/25 |

(Continued)

FOREIGN PATENT DOCUMENTS

| CN | 103746535 | 4/2014 |
| CN | 105048757 | 11/2015 |

(Continued)

OTHER PUBLICATIONS

CN 107425692 A Translation (Year: 2013).*
CN 206948165 U Translation (Year: 2018).*
CN 206834955 U Translation (Year: 2018).*

*Primary Examiner* — Terrance L Kenerly
*Assistant Examiner* — Theodore L Perkins
(74) *Attorney, Agent, or Firm* — JMB Davis Ben-David

(57) ABSTRACT

A linear vibration motor having non-contact vibration damping, comprising a machine housing (1) and a lower holder (11); a stator assembly is provided on the lower holder (11), a vibrator assembly is sleeved outside the stator assembly, the machine housing (1) is sleeved outside the vibrator assembly, two sides of the vibrator assembly are connected to the machine housing (1) by means of a spring (9), the spring (9) has an S-shaped structure, the vibrator assembly comprises a counterweight block (3), a magnetic steel group is provided inside the counterweight block (3), and a balancing block (4) is provided on the magnetic steel group. Further disclosed is an implementation method for a linear vibration motor having non-contact vibration damping. Compared with a linear vibration motor in the prior art, the described linear vibration motor has a more compact structure, and is extremely suitable for motors with small volumes or small vibration direction sizes; and the spring (Continued)

occupies a smaller space, but can provide a larger deformation space, ensuring a vibration sense in a small size and increasing the space utilization of products.

9 Claims, 7 Drawing Sheets

(58) Field of Classification Search
 USPC .......................................................... 310/15
 See application file for complete search history.

(56) References Cited

U.S. PATENT DOCUMENTS

| | | | | |
|---|---|---|---|---|
| 2014/0152126 | A1* | 6/2014 | Kim ..................... | B06B 1/045 |
| | | | | 310/25 |
| 2017/0117790 | A1* | 4/2017 | Mao ..................... | H02K 5/04 |
| 2018/0297063 | A1* | 10/2018 | Mao ..................... | B06B 1/045 |
| 2018/0297072 | A1* | 10/2018 | Xu ...................... | H02K 33/00 |

FOREIGN PATENT DOCUMENTS

| | | | | |
|---|---|---|---|---|
| CN | 105186824 | | 12/2015 | |
| CN | 107425692 | A * | 12/2017 | ............. H02K 33/02 |
| CN | 206727861 | U | 12/2017 | |
| CN | 107565791 | | 1/2018 | |
| CN | 206834955 | U * | 1/2018 | ............. B06B 1/045 |
| CN | 206908500 | U | 1/2018 | |
| CN | 206948165 | U * | 1/2018 | |
| CN | 207354036 | U | 5/2018 | |
| CN | 110086313 | | 8/2019 | |
| CN | 110932515 | | 3/2020 | |
| CN | 110994933 | | 4/2020 | |
| CN | 111049350 | | 4/2020 | |
| CN | 111725965 | | 9/2020 | |
| JP | 2007271878 | | 10/2007 | |
| JP | 2009122544 | | 6/2009 | |
| KR | 20190092851 | | 8/2019 | |

* cited by examiner

LINEAR VIBRATION MOTOR HAVING NON-CONTACT VIBRATION DAMPING, AND IMPLEMENTATION METHOD THEREFOR

CROSS-REFERENCE TO RELATED APPLICATIONS

This is the U.S. National Stage of International Patent Application No. PCT/CN2021/099922 filed on Jun. 14, 2021, which in turn claims the benefit of Chinese Patent Application No. 202010619035.9 filed on Jul. 1, 2020.

FIELD OF THE INVENTION

The present disclosure belongs to the technical field of vibration motors, and particularly to a linear vibration motor having non-contact vibration damping, and an implementation method therefor.

BACKGROUND OF THE INVENTION

In recent years, continuous expansion of the market of smart consumer electronic devices such as mobile phones has promoted constant upgrading of related industries to gain more consumers' favor by comparison from visual sense, auditory sense, camera shooting, tactile sense, and other aspects. As a competitive product in a tactile sense provision component, linear vibration motor plays an increasingly key role in competition. However, due to the cost difference, domestic mobile phones are more inclined to small-sized linear motors at present. How to maintain relatively high performance under a small size becomes a technical direction of continuous research.

In addition, in order to reduce vibration stop time of a linear motor after de-energizing, it is often necessary to try to improve vibration damping. Magnetic fluid has always been used as a main damping method because it occupies a negligible space and has high fixed neutrality. However, as environmental test conditions become more and more stringent, its time-varying damping characteristic has become a major disadvantage affecting customer experience. On this basis, it is further proposed in the industry to use foam, elastic glue, and other elastic solids as a loss component to dissipate kinetic energy generated by vibration after de-energizing. However, such an elastic solid often acts on a spring (contact vibration damping), and changes a stress distribution of the spring, bringing life reliability problems. Therefore, it is particularly important to propose a better damping structure design solution to solve the above problems.

SUMMARY OF THE INVENTION

An objective of the present disclosure is to provide a linear vibration motor having non-contact vibration damping, so as to solve the problems presented in Background of the Invention. The linear vibration motor having non-contact vibration damping provided in the present disclosure has the characteristics of high magnetic stiffness linearity, high vibration consistency, small space occupied by springs, high structure space utilization, better electromagnetic damping, shorter stop time after de-energizing of the motor, simple process, high manufacturability, and low cost.

Another objective of the present disclosure is to provide an implementation method for a linear vibration motor having non-contact vibration damping.

In order to achieve the above objective, the present disclosure provides the following technical solution: a linear vibration motor having non-contact vibration damping, including a casing and a lower bracket. A stator assembly is arranged above the lower bracket. The stator assembly is sheathed with a vibrator assembly. The vibrator assembly is sheathed with the casing. Two sides of the vibrator assembly are connected to the casing by springs. The spring is of an S-shaped structure. The vibrator assembly includes a counterweight block. A steel magnet group is arranged in the counterweight block. A balancing block is arranged above the steel magnet group.

Further, in the present disclosure, an accommodation groove configured to accommodate the balancing block and the steel magnet group is formed in the counterweight block.

Further, in the present disclosure, limiting grooves are symmetrically formed in two sides of the counterweight block, and limiting plates corresponding to the limiting grooves are arranged on the casing.

Further, in the present disclosure, a bracket is connected above the counterweight block.

Further, in the present disclosure, stop pieces are connected to two ends of the spring.

Further, in the present disclosure, the stator assembly includes a pole core, a loss piece, a coil, and a Flexible Printed Circuit (FPC), where the FPC is arranged above the lower bracket, the coil is arranged above the FPC, the loss piece is arranged above the coil, and the pole core is arranged through the loss piece, the coil, the FPC, and the lower bracket.

Further, in the present disclosure, positioning grooves corresponding to the pole core are formed on the lower bracket, the FPC, and the loss piece.

Further, in the present disclosure, the steel magnet group includes a plurality of permanent magnets arranged side by side.

Further, in the present disclosure, an implementation method for the linear vibration motor having non-contact vibration damping includes the following steps:

(1), forming a closed accommodation cavity by a casing (1) and a lower bracket (11) to accommodate a stator assembly and vibrator assembly inside;

(2), forming the vibrator assembly by a counterweight block (3), a balancing block (4), and a steel magnet group, wherein the steel magnet group provides a magnetic field to drive the motor;

(3), forming the stator assembly by a pole core (7), a loss piece (8), a coil (12), and an FPC (10), wherein the coil (12) and the FPC (10) form a circuit to generate an electric field by energizing to drive the motor to vibrate by interaction of the electric field and the magnetic field; and (4), providing elasticity for motion of the motor by springs (9) such that the motor vibrates reciprocally.

Further, in the present disclosure, an accommodation groove configured to accommodate the balancing block and the steel magnet group is formed in the counterweight block. Limiting grooves are symmetrically formed in two sides of the counterweight block, and limiting plates corresponding to the limiting grooves are arranged on the casing. A bracket is connected above the counterweight block. Stop pieces are connected to two ends of the spring. The stator assembly comprises the pole core, the loss piece, the coil, and the FPC, where the FPC is arranged above the lower bracket, the coil is arranged above the FPC, the loss piece is arranged above the coil, and the pole core is arranged through the loss piece, the coil, the FPC, and the lower bracket. Positioning grooves corresponding to the pole core are formed on the lower bracket, the FPC, and the loss piece. The steel magnet group includes a plurality of permanent magnets arranged side by side.

Compared with the prior art, the present disclosure has the following beneficial effects.

1: Compared with a linear vibration motor in the prior art, the linear vibration motor having non-contact vibration damping is more compact in structure and extremely suitable for motors with small sizes or small sizes in vibration directions.

2: In the present disclosure, the spring occupies a small space, but can provide a relatively large deformation space, ensuring a vibration sense in a small size and increasing the space utilization of a product.

3: In the present disclosure, the electromagnetic interaction of the permanent magnet, the pole core, the loss piece, the coil, and the like can dissipate kinetic energy generated by vibration after de-energizing in form of thermal energy, ensuring damping of the motor.

4: In the present disclosure, damping of the motor is affected slightly by temperature, and does not change a stress state of the spring, so that there are brought no service reliability problems.

5: In the present disclosure, both the casing and the lower bracket are made of a magnetically permeable material, so that leakage of a magnetic field generated by the permanent magnet outside the product can be reduced greatly, and the impact on the other electrical, acoustic, and magnetic components can be reduced.

6: In the present disclosure, the total size of the coil and the loss piece can remain unchanged, and the size ratio of the coil and the loss piece is adjusted to adapt different driving solutions with vibration damping remaining unchanged.

Figure 1:
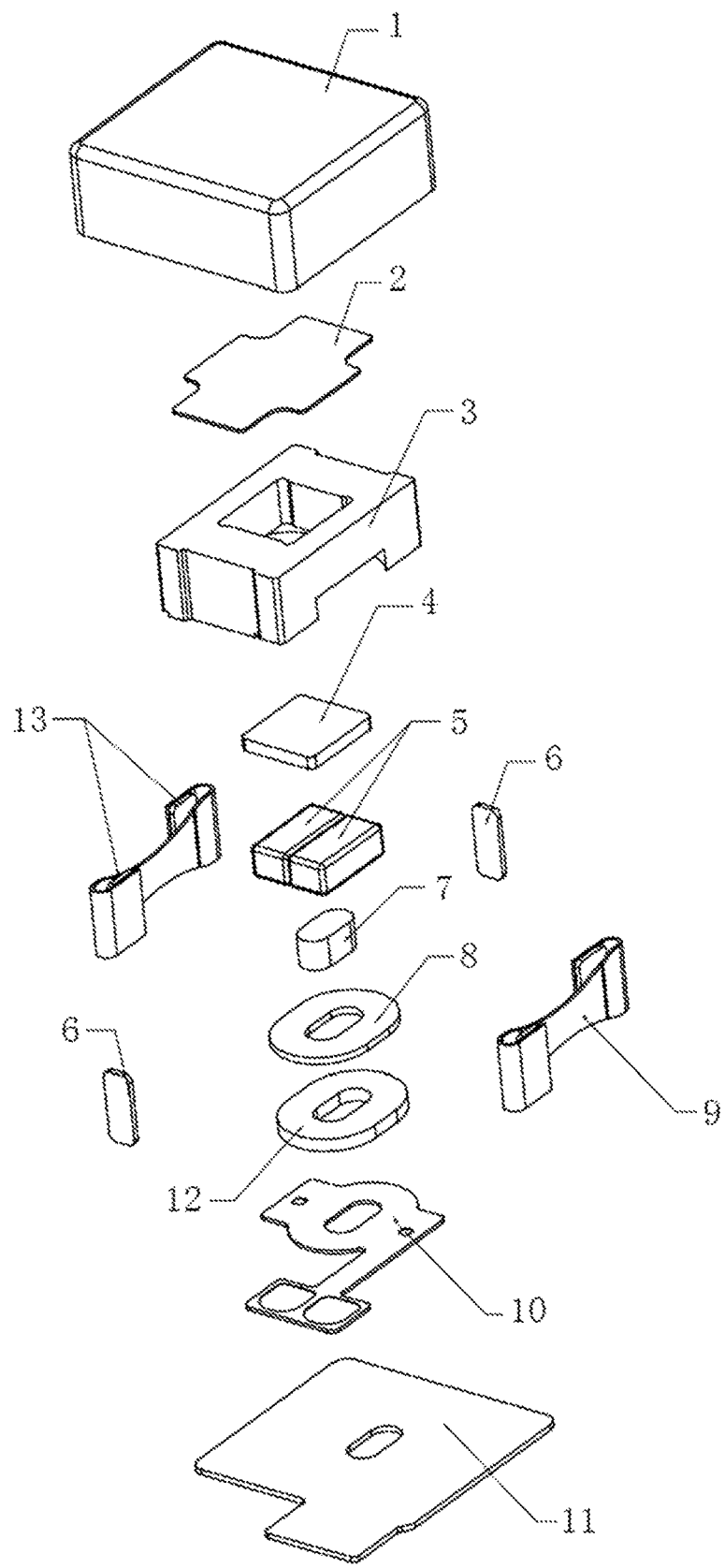
FIG. 1 is a schematic exploded structural diagram according to the present disclosure.
Figure 2:
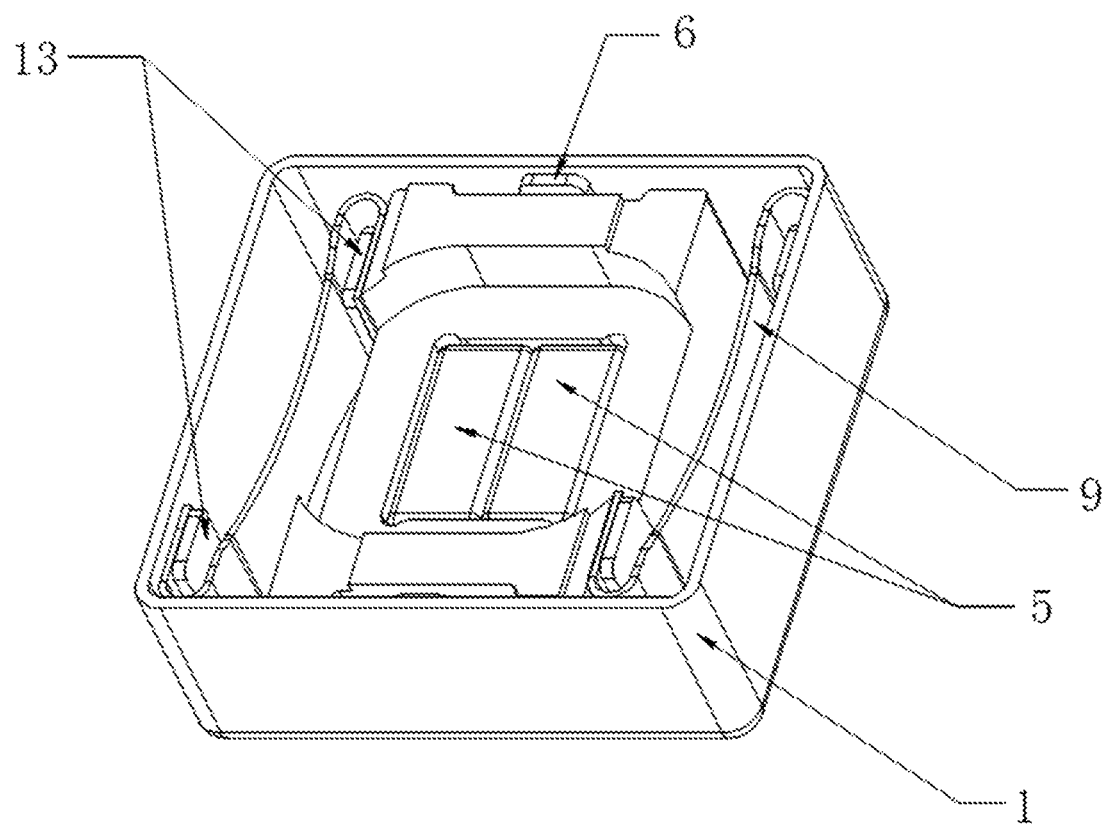
FIG. 2 is a schematic structural diagram after a vibrator assembly is connected to a casing according to the present disclosure.
Figure 3:
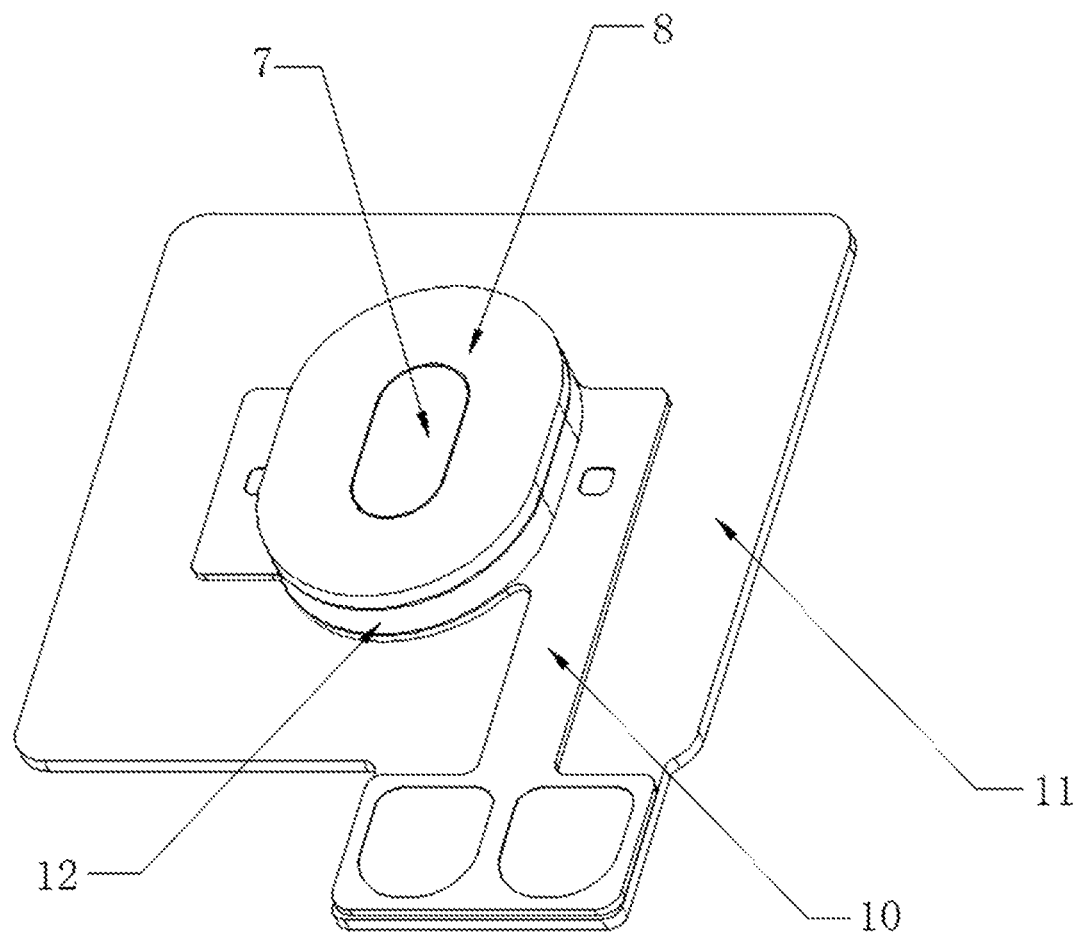
FIG. 3 is a schematic structural diagram of a stator assembly according to the present disclosure.
Figure 4:
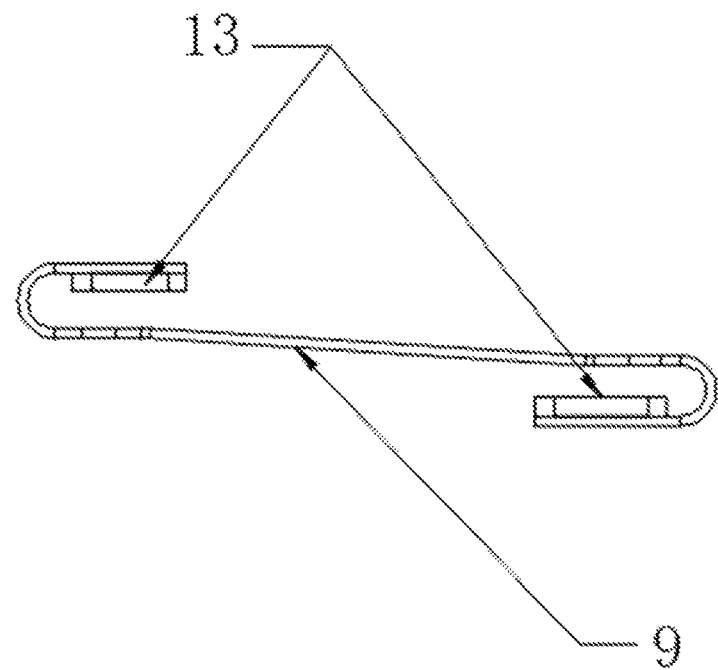
FIG. 4 is a schematic structural diagram of a spring according to the present disclosure.
Figure 5:
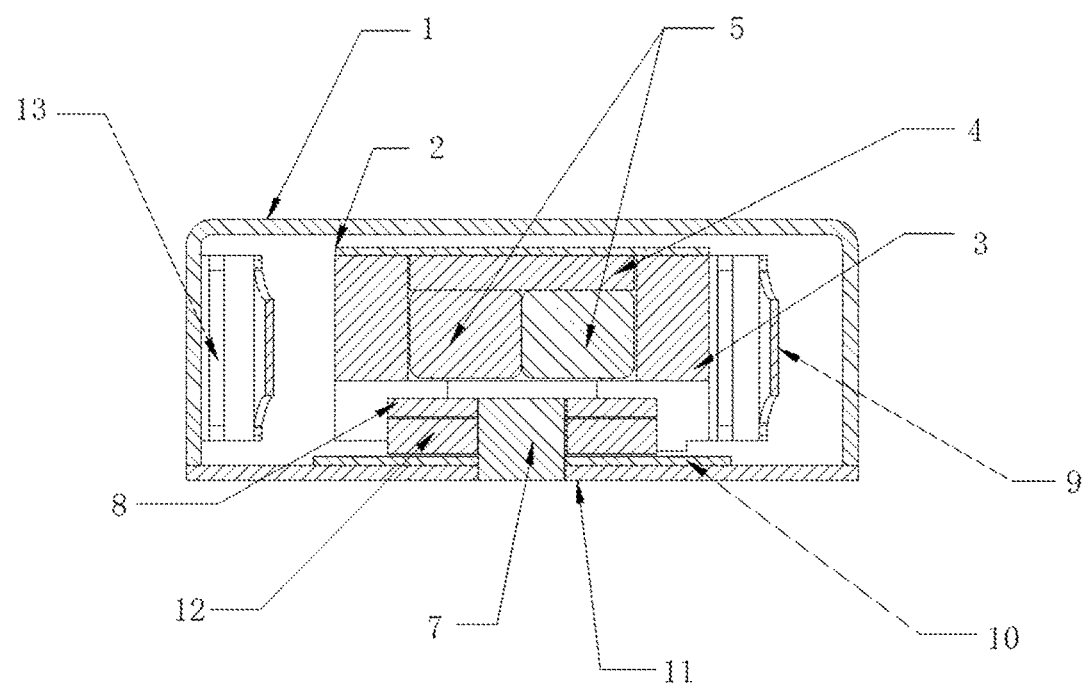
FIG. 5 is a schematic sectional structural diagram according to the present disclosure.
Figure 6:
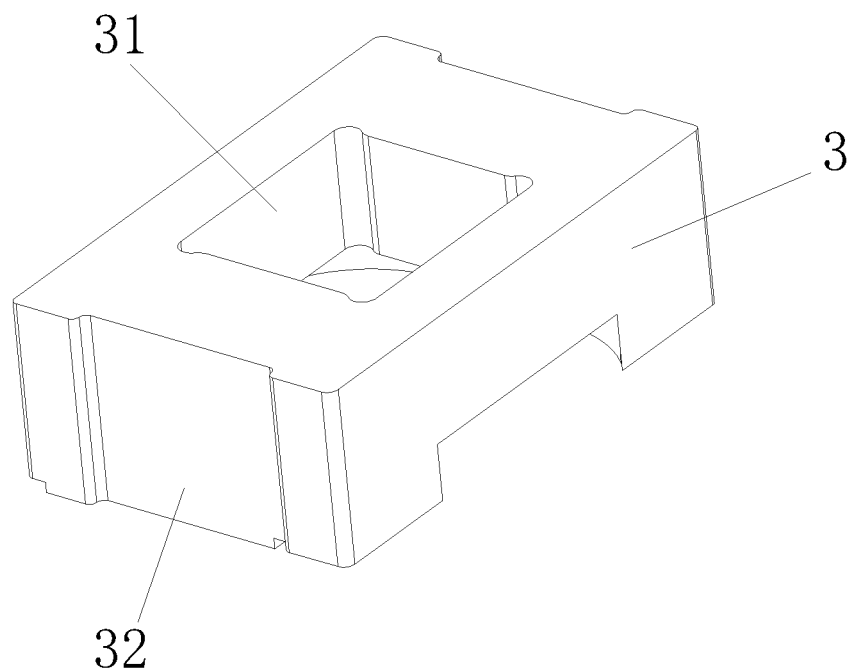
FIG. 6 is a schematic structural diagram of a counterweight block according to the present disclosure.
Figure 7:
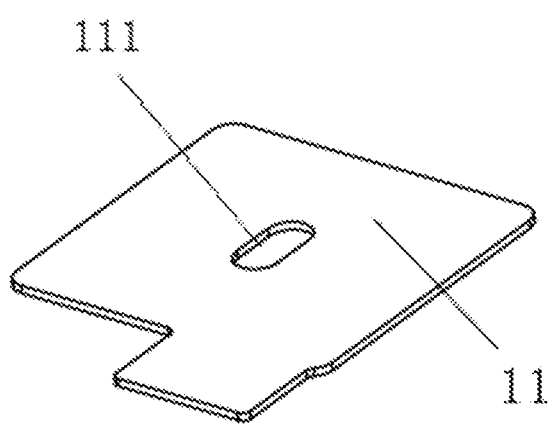
FIG. 7 is a schematic structural diagram of a lower bracket according to the present disclosure.
Figure 8:
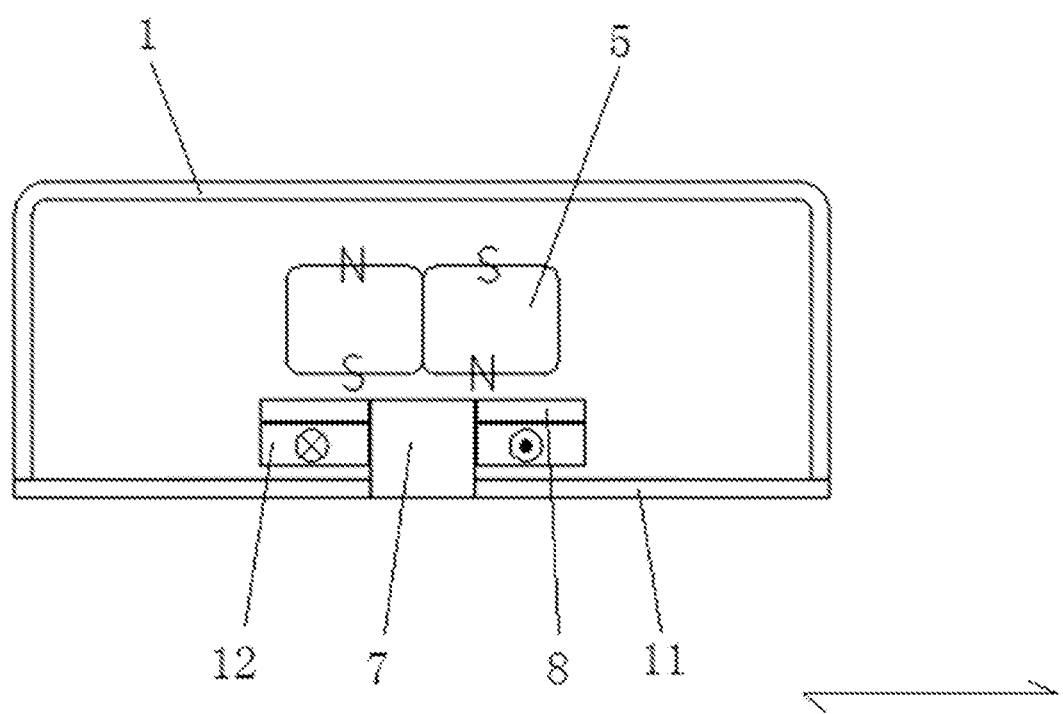
FIG. 8 is a schematic structural diagram of a stress direction of a vibrator assembly according to the present disclosure.

In the drawings: 1—casing; 2—bracket; 3—counterweight block; 31—accommodation groove; 32—limiting groove; 4—balancing block; 5—permanent magnet; 6—limiting plate; 7—pole core; 8—loss piece; 9—spring; 10—FPC; 11—lower bracket; 111—positioning groove; 12—coil; and 13—stop piece.

DETAILED DESCRIPTION OF THE EMBODIMENTS

The technical solutions in embodiments of the present disclosure will be described clearly and completely below in combination with the drawings in the embodiments of the present disclosure. Clearly, the described embodiments are not all but only part of embodiments of the present disclosure. All other embodiments obtained by those of ordinary skill in the art based on the embodiments in the present disclosure without creative work shall fall within the scope of protection of the present disclosure.

Embodiment 1

Referring to FIGS. 1-8, the present disclosure provides the following technical solution: a linear vibration motor having non-contact vibration damping, including a casing 1 and a lower bracket 11. A stator assembly is arranged above the lower bracket 11. The stator assembly is sheathed with a vibrator assembly. The vibrator assembly is sheathed with the casing 1. Two sides of the vibrator assembly are connected to the casing 1 by springs 9. The spring 9 is of an S-shaped structure. The vibrator assembly includes a counterweight block 3. A steel magnet group is arranged in the counterweight block 3. A balancing block 4 is arranged above the steel magnet group.

Further, in the present disclosure, an accommodation groove 31 configured to accommodate the balancing block 4 and the steel magnet group is formed in the counterweight block 3, and a bracket 2 is connected above the counterweight block 3 by welding.

With adoption of the above technical solution, the balancing block 4 is embedded into the accommodation groove 31 and connected to the bracket 2 by welding, and the steel magnet group is embedded into the accommodation groove 31 and adhered to an inner wall of the counterweight block 3 by glue.

Specifically, the balancing block 4 is made of a non-magnetically permeable material such as a high-density alloy, which uses a tungsten alloy in the present embodiment, to solve the problem of attraction unbalance caused by magnetically permeable materials such as the pole core 7, the casing 1, and the lower bracket 11 (when an FPC 10 is off, the casing 1, the lower bracket 11, and the pole core 7 are all magnetically permeable materials attractive to permanent magnets 5, and due to the asymmetric structure in a thickness direction, adjustment is required to achieve attraction balance). As such, a resultant force of the vibrator assembly in each direction at an initial position is zero, and the impact of the magnetic characteristic of the vibrator assembly on the service life of the spring 9 is reduced.

Specifically, the bracket 2 provides an assembling support for fixed connection of the balancing block 4 and the steel magnet group, so as to ensure that the balancing block and the steel magnet group can be fixed in the accommodation groove 31 of the counterweight block 3.

Specifically, the counterweight block 3 is made of a non-magnetically permeable material such as a high-density alloy, which uses a tungsten alloy in the present embodiment, mainly to provide a weight for the vibrator assembly to ensure a vibration sense. In addition, each mesa structure thereon provides a space to assemble and avoid components well.

Further, limiting grooves 32 are symmetrically formed in two sides of the counterweight block 3, and limiting plates 6 corresponding to the limiting grooves 32 are arranged on the casing 1.

With adoption of the above technical solution, the limiting grooves 32 are matched with the limiting plates 6 to limit a stroke of the counterweight block 3, thereby controlling a stroke limit of the vibrator assembly to ensure that a stress of each component is not too high under the stroke limit and further prolong the service life of the vibration motor.

Further, stop pieces 13 are connected to two ends of the spring 9.

With adoption of the above technical solution, the stop piece 13 converts a fixation manner from point fixation (welding) into surface fixation (surface fitting), so as to ensure stable operation of the spring 9 during work.

Specifically, the spring 9 is of an "S"-shaped structure with four break angles that are main deformed regions, and after deformation, the stress is mainly distributed in these regions, so that the stress level is effectively reduced, and the spring 9 is relatively great in deformation and relatively high in life performance. A space from an arc end of the spring to a flat end on the other side is provided for deformation of the spring.

Further, the stator assembly includes a pole core 7, a loss piece 8, a coil 12, and an FPC 10, where the FPC 10 is arranged above the lower bracket 11, the coil 12 is arranged above the FPC 10, the loss piece 8 is arranged above the coil 12, and the pole core 7 is arranged through the loss piece 8, the coil 12, the FPC 10, and the lower bracket 11.

With adoption of the above technical solution, the loss piece 8 is a highly electromagnetic loss material such as copper, aluminum, iron, and a copper-iron alloy. In the present embodiment, copper is used. The pole core 7 is arranged through the loss piece and the coil 12. The changing magnetic field on the pole core 7 generates an induced electromotive force and an induced current on the loss piece and the coil 12 to generate a copper loss to provide a reliable energy consumption for vibration and stopping of the motor. The electromagnetic characteristic of the loss piece changes slightly within a range of a working temperature, so damping of the motor does not change significantly with changing of the working environmental temperature.

Specifically, the loss piece 8 is adjustable in shape, size, and thickness, and can be matched with the coil 12 to provide multiple damping magnitudes and adapt multiple driving solutions.

Specifically, after power interruption of the FPC 10, the vibrator assembly also stores elastic potential energy, kinetic energy, and other mechanical energy, so the product starts to vibrate freely, and the permanent magnet 5 on the vibrator assembly moves together. The movement of the permanent magnet 5 causes constant change of a magnetic flux of the pole core 7, a constantly changing induced electromotive force is generated on the coil 12 and the loss piece 8 to generate a copper loss, and in addition, the pole core 7 has an iron loss. The lost energy comes from the mechanical energy, and is dissipated in form of internal energy, so that the mechanical energy is constantly reduced. Therefore, the vibrator assembly stops faster, and stop time of the motor is reduced.

Further, positioning grooves 111 corresponding to the pole core 7 are formed on the lower bracket 11, the FPC 10, and the loss piece 8.

With adoption of the above technical solution, the positioning groove 111 in the lower bracket 11 provides positioning for assembling of the pole core 7, and the positioning grooves 111 in the FPC 10 and the loss piece 8 can implement accurate assembling under positioning of the pole core 7.

Further, the steel magnet group includes two permanent magnets 5 arranged side by side.

With adoption of the above technical solution, the steel magnet group is relatively small, short in magnetic path, and high in magnetic field utilization, and the two exterior components of the casing 1 and the lower bracket 11 are both made of a magnetic conducting material. Therefore, the product is low in leakage flux, and problems about electromagnetic compatibility are effectively solved.

Embodiment 2

Figure 9:
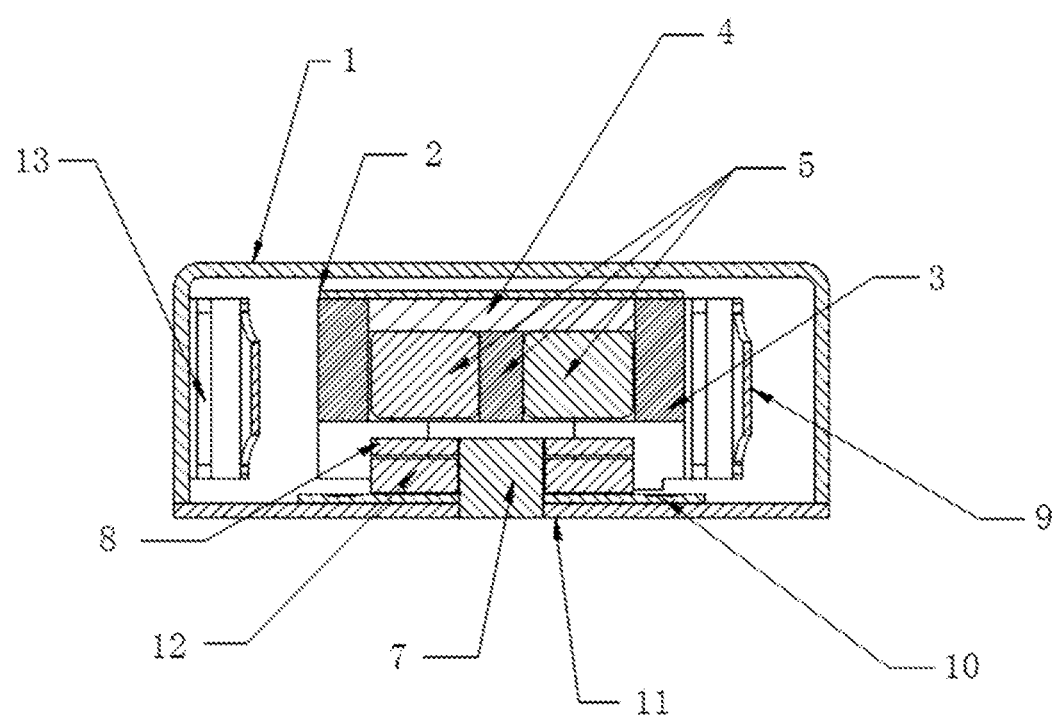
FIG. 9 is a schematic structural diagram according to embodiment 2 of the present disclosure.

Referring to FIG. 9, the present embodiment differs from embodiment 1 as follows: further, the steel magnet group includes three permanent magnets 5 arranged side by side.

Further, an implementation method for the linear vibration motor having non-contact vibration damping in the present disclosure includes the following steps.

(1) A casing 1 and a lower bracket 11 form a closed accommodation cavity to accommodate a stator assembly and vibrator assembly inside.

(2) A counterweight block 3, a balancing block 4, and a steel magnet group form the vibrator assembly, and the steel magnet group provides a magnetic field to drive the motor.

(3) A pole core 7, a loss piece 8, a coil 12, and an FPC 10 form the stator assembly, and the coil 12 and the FPC 10 form a circuit to generate an electric field by energizing to drive the motor to vibrate by interaction of the electric field and the magnetic field.

(4) Springs 9 provide elasticity for motion of the motor such that the motor vibrates reciprocally.

In summary, compared with a linear vibration motor in the prior art, the linear vibration motor having non-contact vibration damping is more compact in structure and extremely suitable for motors with small sizes or small sizes in vibration directions. In the present disclosure, the spring occupies a small space, but can provide a relatively large deformation space, ensuring a vibration sense in a small size and increasing the space utilization of a product. In the present disclosure, the electromagnetic interaction of the permanent magnet, the pole core, the loss piece, the coil, and the like can dissipate kinetic energy generated by vibration after de-energizing in form of thermal energy, ensuring damping of the motor. In the present disclosure, damping of the motor is affected slightly by temperature, and does not change a stress state of the spring, so that there are brought no service reliability problems. In the present disclosure, both the casing and the lower bracket are made of a magnetically permeable material, so that leakage of a magnetic field generated by the permanent magnet outside the product can be reduced greatly, and the impact on the other electrical, acoustic, and magnetic components can be reduced. In the present disclosure, the total size of the coil and the loss piece can remain unchanged, and the size ratio of the coil and the loss piece is adjusted to adapt different driving solutions with vibration damping remaining unchanged.

Although the embodiments of the present disclosure have been shown and described, it can be understood by those of ordinary skill in the art that various variations, modifications, replacements, and transformations may be made to these embodiments without departing from the principle and spirit of the present disclosure. The scope of the present disclosure is defined by the appended claims and equivalents thereof.

The invention claimed is:

1. A linear vibration motor having non-contact vibration damping, comprising a casing and a lower bracket, wherein a stator assembly is arranged above the lower bracket; the stator assembly is sheathed with a vibrator assembly; the vibrator assembly is sheathed with the casing; two sides of the vibrator assembly are connected to the casing by springs;

the spring is of an S-shaped structure; the vibrator assembly comprises a counterweight block; a steel magnet group is arranged in the counterweight block; and a balancing block is arranged above the steel magnet group;

wherein the stator assembly comprises a pole core, a loss piece, a coil, and a Flexible Printed Circuit (FPC), wherein the FPC is arranged above the lower bracket, the coil is arranged above the FPC, the loss piece is arranged above the coil, and the pole core is arranged through the loss piece, the coil, the FPC, and the lower bracket;

wherein the balancing block is made of a non-magnetically permeable material for balancing attraction of magnetically permeable materials, including the lower bracket, the casing and the pole core, to a permanent magnet of the steel magnet group, such that a resultant force of the vibrator assembly in each direction at an initial position is zero.

2. The linear vibration motor having non-contact vibration damping according to claim 1, wherein an accommodation groove configured to accommodate the balancing block and the steel magnet group is formed in the counterweight block.

3. The linear vibration motor having non-contact vibration damping according to claim 1, wherein limiting grooves are symmetrically formed in two sides of the counterweight block, and limiting plates corresponding to the limiting grooves are arranged on the casing.

4. The linear vibration motor having non-contact vibration damping according to claim 1, wherein a bracket is connected above the counterweight block.

5. The linear vibration motor having non-contact vibration damping according to claim 1, wherein stop pieces are connected to two ends of the spring.

6. The linear vibration motor having non-contact vibration damping according to claim 1, wherein positioning grooves corresponding to the pole core are formed on the lower bracket, the FPC, and the loss piece.

7. The linear vibration motor having non-contact vibration damping according to claim 1, wherein the steel magnet group comprises a plurality of permanent magnets arranged side by side.

8. An implementation method for the linear vibration motor having non-contact vibration damping according to claim 1, the method comprising the following steps:

forming a closed accommodation cavity by a casing and a lower bracket to accommodate a stator assembly and vibrator assembly inside;

forming the vibrator assembly by a counterweight block, a balancing block, and a steel magnet group, wherein the steel magnet group provides a magnetic field to drive the motor;

forming the stator assembly by a pole core, a loss piece, a coil, and an FPC, wherein the coil and the FPC form a circuit to generate an electric field by energizing to drive the motor to vibrate by interaction of the electric field and the magnetic field; and providing elasticity for motion of the motor by springs such that the motor vibrates reciprocally.

9. The linear vibration motor having non-contact vibration damping according to claim 8, wherein an accommodation groove configured to accommodate the balancing block and the steel magnet group is formed in the counterweight block; limiting grooves are symmetrically formed in two sides of the counterweight block, and limiting plates corresponding to the limiting grooves are arranged on the casing; a bracket is connected above the counterweight block; stop pieces are connected to two ends of the spring; the stator assembly comprises the pole core, the loss piece, the coil, and the FPC, wherein the FPC is arranged above the lower bracket, the coil is arranged above the FPC, the loss piece is arranged above the coil, and the pole core is arranged through the loss piece, the coil, the FPC, and the lower bracket; positioning grooves corresponding to the pole core are formed on the lower bracket, the FPC, and the loss piece; and the steel magnet group comprises a plurality of permanent magnets arranged side by side.

\* \* \* \* \*